(12) United States Patent
Sutherland

(10) Patent No.: US 11,381,931 B2
(45) Date of Patent: Jul. 5, 2022

(54) EMERGENCY ALERT SYSTEMS WITH SECONDARY ALERTS

(71) Applicant: In-telligent Properties LLC, Chicago, IL (US)

(72) Inventor: Allan C. Sutherland, Orland Park, IL (US)

(73) Assignee: In-telligent Properties LLC, Chicago, IL (US)

( * ) Notice: Subject to any disclaimer, the term of this patent is extended or adjusted under 35 U.S.C. 154(b) by 5 days.

(21) Appl. No.: 17/023,964

(22) Filed: Sep. 17, 2020

(65) Prior Publication Data

US 2021/0084710 A1  Mar. 18, 2021

Related U.S. Application Data

(60) Provisional application No. 62/901,390, filed on Sep. 17, 2019.

(51) Int. Cl.
*H04W 4/33* (2018.01)
*H04W 4/024* (2018.01)
(Continued)

(52) U.S. Cl.
CPC .............. *H04W 4/024* (2018.02); *G08B 7/06* (2013.01); *G08B 25/10* (2013.01);
(Continued)

(58) Field of Classification Search
CPC ....... H04W 4/021; H04W 4/023; H04W 4/33; H04W 4/50; H04W 4/90; H04W 12/03;
(Continued)

(56) References Cited

U.S. PATENT DOCUMENTS 6,842,628 B1 *  1/2005  Arnold ................ H04W 12/041
713/181
7,149,533 B2  12/2006  Laird et al.
(Continued)

FOREIGN PATENT DOCUMENTS

WO  2010009324 A2  1/2010
WO  2014072510 A2  5/2014
(Continued)

OTHER PUBLICATIONS

Apple Is Launching a Vast Project to Map the Inside of Every Large Building It Can, Edwards, Business Insider, Jun. 7, 2014, pp. 1-3.
(Continued)

*Primary Examiner* — Jean A Gelin
(74) *Attorney, Agent, or Firm* — Banner & Witcoff, Ltd.

(57) ABSTRACT

Aspects discussed herein relate to providing alerts to a community of devices located in or near a geographic are such as a building or property. The alerts override any alert-inhibiting state of the mobile device to deliver audio, visual, and/or haptic alerts in emergency situations. The communication and emergency alert system may be used to communicate with many different communities of people. Moreover, certain individuals may be members of more than one community at the same time, and the communities themselves may change over time based both on the user's preferences and on their physical locations. Multiple different alerts can be sent to different mobile devices for a single event. The alerts can be customized to particular mobile devices depending on the community to which the mobile device belongs for the event.

18 Claims, 11 Drawing Sheets

| User | Community | Role | Primary Device | Secondary Device(s) | External Alert Preferences |
|---|---|---|---|---|---|
| 1 | School | Administrator | Smartphone | Smartwatch/Landline | Traffic |
| 2 | Safety | Firefighter | Smartphone | Landline | Fire/Safety |
| 3 | School | Teacher | Smartphone | Tablet/Landline | None |
| 4 | Safety | Police | Smartphone | Pager/Landline | Crime |
| ... | | | | | |
| n | Safety | EMT | Smartphone | Pager/Smartwatch | Fire/Crime/Safety |

400

(51) Int. Cl.

| | |
|---|---|
| *G08B 7/06* | (2006.01) |
| *H04W 4/90* | (2018.01) |
| *H04W 76/50* | (2018.01) |
| *H04W 4/021* | (2018.01) |
| *H04W 4/02* | (2018.01) |
| *H04W 4/12* | (2009.01) |
| *H04W 12/069* | (2021.01) |
| *H04L 9/40* | (2022.01) |
| *H04L 67/53* | (2022.01) |
| *G08B 25/10* | (2006.01) |
| *G08B 3/00* | (2006.01) |
| *G08B 5/00* | (2006.01) |
| *G08B 6/00* | (2006.01) |

(52) U.S. Cl.
CPC ...... *H04L 63/0853* (2013.01); *H04L 63/0884* (2013.01); *H04L 67/20* (2013.01); *H04W 4/021* (2013.01); *H04W 4/023* (2013.01); *H04W 4/12* (2013.01); *H04W 4/33* (2018.02); *H04W 4/90* (2018.02); *H04W 12/069* (2021.01); *H04W 76/50* (2018.02); *G08B 3/00* (2013.01); *G08B 5/00* (2013.01); *G08B 6/00* (2013.01)

(58) Field of Classification Search
CPC .. H04W 12/041; H04W 84/12; H04N 21/814; H04N 21/2362; G04B 25/10; G04B 3/00; G04B 5/00; G04B 6/00; H04L 63/0853; H04L 63/0884; H04L 67/20
See application file for complete search history.

(56) References Cited

U.S. PATENT DOCUMENTS

| | | | |
|---|---|---|---|
| 7,180,415 B2 | 2/2007 | Bankert et al. | |
| 7,460,020 B2 | 12/2008 | Reyes et al. | |
| 7,590,723 B2 | 9/2009 | Mager et al. | |
| 8,001,000 B2 | 8/2011 | Butterworth | |
| 8,013,734 B2 | 9/2011 | Saigh et al. | |
| 8,396,485 B2 | 3/2013 | Grainger et al. | |
| 8,624,727 B2 | 1/2014 | Saigh et al. | |
| 8,792,906 B2 | 7/2014 | Batada et al. | |
| 8,866,673 B2 | 10/2014 | Mendelson | |
| 8,971,930 B2 | 3/2015 | Li et al. | |
| 9,049,555 B2 | 6/2015 | Wang et al. | |
| 9,288,620 B2 | 3/2016 | Menendez | |
| 9,351,114 B2 | 5/2016 | Chatterjee et al. | |
| 9,363,638 B1 | 6/2016 | Jones | |
| 9,549,287 B2 | 1/2017 | Baran et al. | |
| 9,589,435 B2 | 3/2017 | Finlow-Bates | |
| 9,591,444 B2 | 3/2017 | Qiu | |
| 9,712,960 B2 | 7/2017 | Kumar et al. | |
| 9,788,153 B1 | 10/2017 | Newstadt et al. | |
| 9,788,159 B2 | 10/2017 | Wang et al. | |
| 9,826,354 B2 | 11/2017 | Alsina et al. | |
| 9,826,358 B2 | 11/2017 | Ryan et al. | |
| 9,875,251 B2 | 1/2018 | Jones | |
| 9,888,371 B1 | 2/2018 | Jacob | |
| 9,900,174 B2 | 2/2018 | Gamberini | |
| 10,251,023 B2 | 4/2019 | Sutherland | |
| 10,454,876 B2 * | 10/2019 | Acquista ............... H04L 51/32 | |
| 10,650,665 B2 | 5/2020 | Merjanian et al. | |
| 11,132,882 B1 * | 9/2021 | Giobbi ............... G08B 13/2462 | |
| 11,146,680 B2 * | 10/2021 | Leavitt ............... H04L 67/02 | |
| 2005/0096040 A1 | 5/2005 | Haberman et al. | |
| 2005/0197775 A1 | 9/2005 | Smith | |
| 2006/0067300 A1 * | 3/2006 | Poustchi ........... H04M 3/42314 370/352 | |
| 2006/0121887 A1 | 6/2006 | Chilukoor | |
| 2006/0293048 A1 | 12/2006 | Swanson et al. | |
| 2008/0189162 A1 | 8/2008 | Ganong et al. | |
| 2009/0058632 A1 * | 3/2009 | Hicks, III ............... H04W 4/20 340/517 | |
| 2010/0121567 A1 | 5/2010 | Mendelson | |
| 2010/0231379 A1 * | 9/2010 | Hutzler ............. G08B 21/0453 340/539.12 | |
| 2011/0112768 A1 | 5/2011 | Doyle | |
| 2011/0148634 A1 | 6/2011 | Putz | |
| 2012/0084372 A1 | 4/2012 | Cohen | |
| 2012/0274866 A1 * | 11/2012 | Tada ........................ H04N 5/64 361/752 | |
| 2012/0327837 A1 * | 12/2012 | Harrington ............. H04W 4/90 370/312 | |
| 2013/0099977 A1 | 4/2013 | Sheshadri et al. | |
| 2013/0203445 A1 | 8/2013 | Grainger et al. | |
| 2013/0247094 A1 * | 9/2013 | Hardin ............... H04N 21/2385 725/33 | |
| 2013/0316740 A1 | 11/2013 | Scarafia et al. | |
| 2014/0057648 A1 | 2/2014 | Lyman et al. | |
| 2014/0066090 A1 | 3/2014 | Henderson | |
| 2014/0220883 A1 | 8/2014 | Emigh et al. | |
| 2014/0280526 A1 | 9/2014 | Filho | |
| 2014/0280792 A1 * | 9/2014 | Sigoure ............... H04L 41/0654 709/224 | |
| 2014/0358666 A1 | 12/2014 | Baghaie et al. | |
| 2015/0031388 A1 | 1/2015 | Chatterjee et al. | |
| 2015/0111524 A1 | 4/2015 | South | |
| 2015/0140924 A1 * | 5/2015 | Marathe .................. H04H 20/59 455/3.01 | |
| 2015/0148061 A1 | 5/2015 | Koukoumidis et al. | |
| 2015/0223022 A1 | 8/2015 | Kumar et al. | |
| 2015/0237470 A1 | 8/2015 | Mayor et al. | |
| 2016/0007156 A1 | 1/2016 | Chiou et al. | |
| 2016/0047663 A1 | 2/2016 | Iyer et al. | |
| 2016/0049064 A1 | 2/2016 | McNabb et al. | |
| 2016/0142872 A1 | 5/2016 | Nicholson et al. | |
| 2016/0360360 A1 | 12/2016 | Jones | |
| 2017/0099579 A1 | 4/2017 | Ryan et al. | |
| 2017/0103080 A1 | 4/2017 | Quong | |
| 2017/0103410 A1 | 4/2017 | Kerr et al. | |
| 2017/0111247 A1 * | 4/2017 | Uchiyama ............. G06F 3/1229 | |
| 2017/0148306 A1 | 5/2017 | Wolfson et al. | |
| 2017/0289754 A1 | 10/2017 | Anderson et al. | |
| 2017/0311131 A1 | 10/2017 | South et al. | |
| 2018/0054713 A1 | 2/2018 | South et al. | |
| 2018/0364654 A1 | 12/2018 | Locke et al. | |
| 2018/0365942 A1 | 12/2018 | Molloy et al. | |
| 2019/0007548 A1 | 1/2019 | Sit et al. | |
| 2019/0166457 A1 | 5/2019 | Lipowski et al. | |
| 2019/0261145 A1 | 8/2019 | South et al. | |
| 2019/0278867 A1 * | 9/2019 | Nasir ...................... H04L 51/16 | |
| 2020/0084608 A1 | 3/2020 | Chung et al. | |
| 2020/0137441 A1 * | 4/2020 | Lee ....................... G06N 20/00 | |
| 2021/0076454 A1 | 3/2021 | Palanivel et al. | |
| 2021/0110682 A1 * | 4/2021 | Howard ............. G06F 3/04842 | |
| 2021/0158666 A1 | 5/2021 | Derickson | |
| 2021/0215789 A1 | 7/2021 | Hu et al. | |

FOREIGN PATENT DOCUMENTS

| | | |
|---|---|---|
| WO | 2014089462 A2 | 6/2014 |
| WO | 2014206627 A1 | 12/2014 |
| WO | 2015034904 A1 | 3/2015 |

OTHER PUBLICATIONS

Micro-Location for Internet of Things Equipped Smart Buildings, Zafari et al., arXiv:1501.01539 v1, Jan. 7, 2015, pp. 1-16.

* cited by examiner

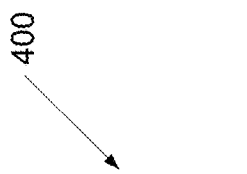

FIG. 4

| User | Community | Role | Primary Device | Secondary Device(s) | External Alert Preferences |
|---|---|---|---|---|---|
| 1 | School | Administrator | Smartphone | Smartwatch/Landline | Traffic |
| 2 | Safety | Firefighter | Smartphone | Landline | Fire/Safety |
| 3 | School | Teacher | Smartphone | Tablet/Landline | None |
| 4 | Safety | Police | Smartphone | Pager/Landline | Crime |
| ... | | | | | |
| n | Safety | EMT | Smartphone | Pager/Smartwatch | Fire/Crime/Safety |

| Alert | Fire | Shots Fired |
|---|---|---|
| Primary Alert Group | Administrators | Administrators |
| Primary Alert Location | All Locations | All Locations |
| Primary Alert | Haptic/Sound/message file | Haptic/Sound/message file |
| Primary Alert Response Criteria | Acknowledgement from at least one Administrator | Acknowledgement from at least one Administrator |
| Secondary Alert Group | First Responders | Police |
| Secondary Alert Location | Within geofence | Within geofence |
| Secondary Alert | Haptic/Sound/message file | Haptic/Sound/message file |
| Secondary Alert Response Criteria | Acknowledgement from at least five First Responders | Acknowledgement from at least five First Responders |
| Tertiary Alert Group | Teachers | Teachers |
| Tertiary Alert Location | Within Facility | Within Facility |
| Tertiary Alert | Haptic/Sound/message file | Haptic/Sound/message file |
| Tertiary Alert Response Criteria | Response from all notified teachers within facility | Response from all notified teachers within facility |
| ... | | |

FIG. 6

EMERGENCY ALERT SYSTEMS WITH SECONDARY ALERTS

CROSS-REFERENCE TO RELATED APPLICATIONS

The instant application claims priority to U.S. Provisional Patent Application No. 62/901,390, titled "Emergency Alert Systems" and filed Sep. 17, 2019, the disclosure of which is hereby incorporated by reference in its entirety.

FIELD OF USE

Aspects of the disclosure relate generally to communication systems and more specifically to important and emergency alert systems.

BACKGROUND

People use many different systems to send and receive messages with others, including individual emails, group emails, texts to mobile devices, etc. during emergency events. Existing emergency alert systems like the Emergency Alert System rely on people listening to a radio, television, or similar device to receive alerts. These devices may interfere with sleep and therefore are usually turned off while people are sleeping or otherwise busy. The precision in which emergency alert systems may transmit alerts is limited to a metropolitan area. For example, if there is a fire in Orange County, Calif., the existing emergency alerts systems would notify the entire Los Angeles metropolitan area. Alert systems utilizing mobile phones are similarly limited as they do not allow emergency alerts to be audibly provided while the mobile phone is in a silent or do not disturb mode and the ability to target emergency alerts to mobile phones within a specific geographic area is limited.

Aspects described herein may address these and other problems, and generally improve the quality, efficiency, and speed of emergency alerts by improving the ability of a system to quickly and easily identify groups of people such that these people may be quickly contacted in the event of an emergency.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects discussed herein relate to communicating with a community of people determined by a geofencing system to be physically in or near a location such as a building or property, wherein the system overrides any alert-inhibiting state in the people's mobile devices (or any other device) to deliver audio or visual alerts in emergency situations. In addition to providing emergency alerts, the present system may be used by building managers to communicate with people living or working in a building, by university administration to communicate with students or instructors on a university campus, by airport management to communicate with travelers passing through the airport, by a stadium operator to communicate with fans at a sporting game, and a variety of other uses. As may be appreciated, the present communication and emergency alert system may be used by many different groups of administrators to communicate with many different communities of people. Moreover, certain individuals may be members of more than one community at the same time, and the communities themselves may change over time based both on the user's preferences and on their physical locations. Multiple different alerts can be sent to different mobile devices for a single event. The alerts can be customized to particular mobile devices depending on the community to which the mobile device belongs for the event.

In one embodiment of the invention, a computer-implemented method includes obtaining an indication of an alert condition in a building, determining that the alert condition includes an emergency condition in the building, determining a location for a plurality of mobile devices, each mobile device in the plurality of mobile devices being associated with a first alert group for the building, generating, based on the alert condition, an alert associated with each mobile device, determining a second plurality of mobile devices, each mobile device in the second plurality of mobile devices being associated with a second alert group for the building, generating, based on the alert condition, a second alert for each second mobile device in the second plurality of mobile devices, and transmitting the generated alerts to the plurality of mobile devices and the second plurality of mobile devices.

In yet another embodiment of the invention, the alert includes at least one notification selected from the group consisting of an audible notification, a visual notification, and a haptic notification, the second alert includes at least one notification selected from the group consisting of an audible notification, a visual notification, and a haptic notification, and the alert and the second alert include a different set of notifications.

In still another embodiment of the invention, the first alert group is associated with a first community for the building and the second alert group is associated with a second community distinct from the building.

In yet still another embodiment of the invention, the computer-implemented method further includes determining that a third mobile device is located within a threshold distance the building, generating a third alert for the third mobile device, and transmitting the third alert to the third mobile device.

In yet another additional embodiment of the invention, the computer-implemented method further includes determining that a first mobile device in the plurality of mobile devices has not provided a response to the alert transmitted to the first mobile device, determining a secondary device associated with the first mobile device, and transmitting the alert to the secondary device.

In still another additional embodiment of the invention, the generated alert for the plurality of mobile devices is associated with a first tier of alert for the alert condition and the generated alert for the second plurality of mobile devices is associated with a second tier of alert for the alert condition.

In yet still another additional embodiment of the invention, the computer-implemented method further includes determining the location of each mobile device in the plurality of mobile devices, identifying a subset of mobile devices located within a threshold distance of the building, and transmitting the generated alert to the mobile devices includes transmitting the generated alert to the subset of mobile devices located within the threshold distance of the building.

Yet another embodiment of the invention includes a computing device including a processor and a memory in communication with the processor and storing instructions that, when read by the processor, cause the computing device to obtain an indication of an alert condition in a building, determine that the alert condition includes an emergency condition in the building, determine a location for a plurality of mobile devices, each mobile device in the plurality of mobile devices being associated with a first alert group for the building, generate, based on the alert condition, an alert associated with each mobile device, determine a second plurality of mobile devices, each mobile device in the second plurality of mobile devices being associated with a second alert group for the building, generate, based on the alert condition, a second alert for each second mobile device in the second plurality of mobile devices, and transmit the generated alerts to the plurality of mobile devices and the second plurality of mobile devices.

In yet another embodiment of the invention, the alert includes at least one notification selected from the group consisting of an audible notification, a visual notification, and a haptic notification, the second alert includes at least one notification selected from the group consisting of an audible notification, a visual notification, and a haptic notification, and the alert and the second alert include a different set of notifications.

In still another embodiment of the invention, the first alert group is associated with a first community for the building and the second alert group is associated with a second community distinct from the building.

In yet still another embodiment of the invention, the instructions, when read by the processor, further cause the computing device to determine that a third mobile device is located within a threshold distance the building, generate a third alert for the third mobile device, and transmit the third alert to the third mobile device.

In yet another additional embodiment of the invention, the instructions, when read by the processor, further cause the computing device to determine that a first mobile device in the plurality of mobile devices has not provided a response to the alert transmitted to the first mobile device, determine a secondary device associated with the first mobile device, and transmit the alert to the secondary device.

In still another additional embodiment of the invention, the instructions, when read by the processor, further cause the computing device to determine the location of each mobile device in the plurality of mobile devices, identify a subset of mobile devices located within a threshold distance of the building, and transmit the generated alert to the mobile devices includes transmitting the generated alert to the subset of mobile devices located within the threshold distance of the building.

In yet still another additional embodiment of the invention, the generated alert for the plurality of mobile devices is associated with a first tier of alert for the alert condition and the generated alert for the second plurality of mobile devices is associated with a second tier of alert for the alert condition.

Still another embodiment of the invention includes a non-transitory machine-readable medium storing instructions that, when executed by one or more processors, cause the one or more processors to perform steps including obtaining an indication of an alert condition in a building, determining that the alert condition includes an emergency condition in the building, determining a location for a plurality of mobile devices, each mobile device in the plurality of mobile devices being associated with a first alert group for the building, generating, based on the alert condition, an alert associated with each mobile device, determining a second plurality of mobile devices, each mobile device in the second plurality of mobile devices being associated with a second alert group for the building, generating, based on the alert condition, a second alert for each second mobile device in the second plurality of mobile devices, and transmitting the generated alerts to the plurality of mobile devices and the second plurality of mobile devices.

In yet another embodiment of the invention, the alert includes at least one notification selected from the group consisting of an audible notification, a visual notification, and a haptic notification, the second alert includes at least one notification selected from the group consisting of an audible notification, a visual notification, and a haptic notification, and the alert and the second alert include a different set of notifications.

In still another embodiment of the invention, the first alert group is associated with a first community for the building and the second alert group is associated with a second community distinct from the building.

In yet still another embodiment of the invention, the instructions, when executed by one or more processors, further cause the one or more processors to perform steps including determining that a third mobile device is located within a threshold distance the building, generating a third alert for the third mobile device, and transmitting the third alert to the third mobile device.

In yet another additional embodiment of the invention, the instructions, when executed by one or more processors, further cause the one or more processors to perform steps including determining the location of each mobile device in the plurality of mobile devices, identifying a subset of mobile devices located within a threshold distance of the building, and transmitting the generated alert to the mobile devices includes transmitting the generated alert to the subset of mobile devices located within the threshold distance of the building.

In still another additional embodiment of the invention, the generated alert for the plurality of mobile devices is associated with a first tier of alert for the alert condition and the generated alert for the second plurality of mobile devices is associated with a second tier of alert for the alert condition.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 depicts a community database according to one or more aspects of the disclosure;

FIG. 6 depicts an alert database according to one or more aspects of the disclosure;

DETAILED DESCRIPTION

Figure 1:
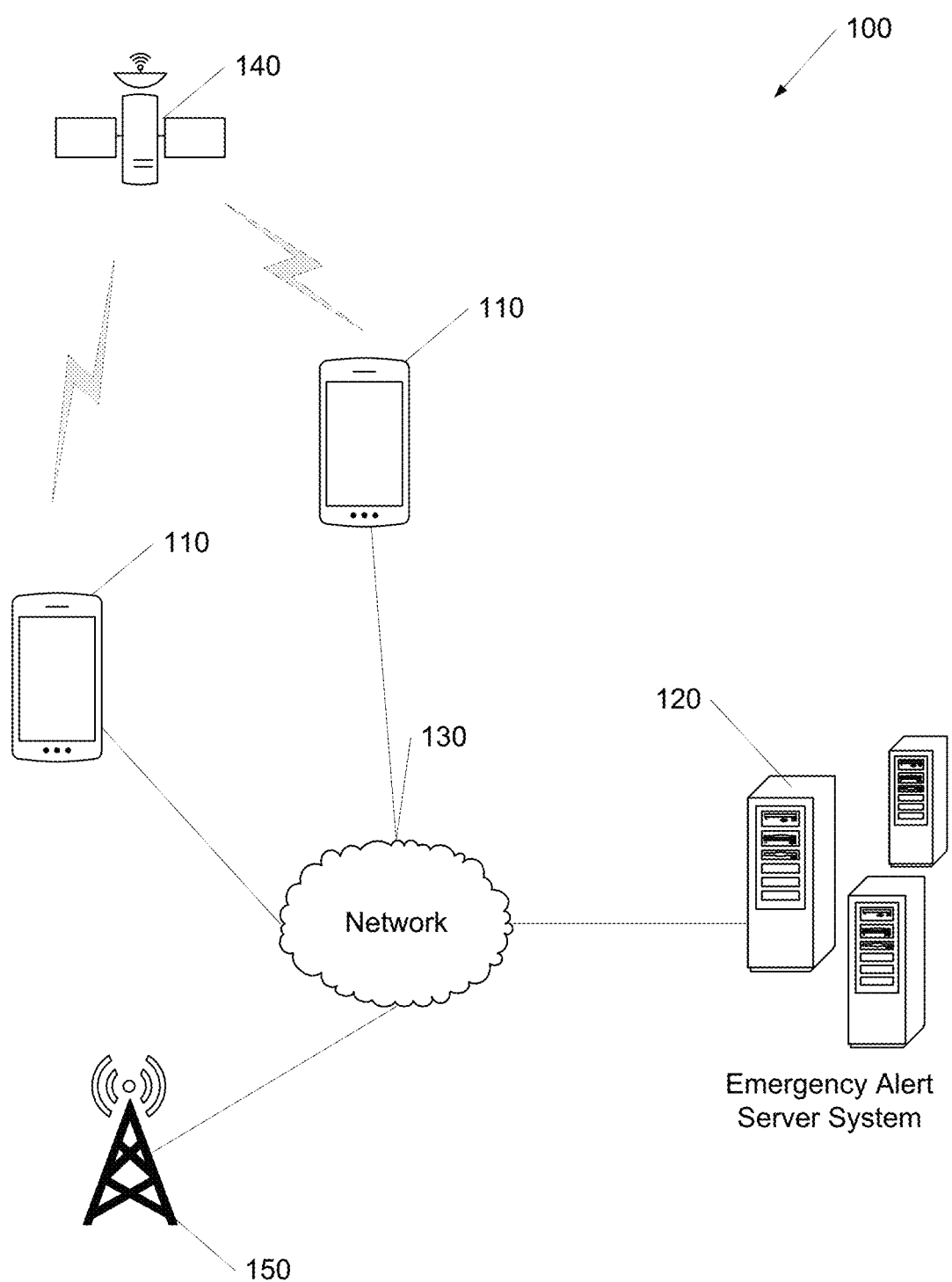
FIG. 1 illustrates an example of an emergency alert system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Emergency alert systems may override any alert-inhibiting state in a person's mobile device to deliver an audio or visual alert in an emergency. Emergency alert systems provide a method of communicating with members of a community by using geofencing to determine the location of users such that they may optionally be automatically added to a community. Members may be auto-subscribed into the community based on their physical locations. These subscriptions may change from time to time as the mobile device moves. Users may also be added to a community based on their own user preferences. People may be members of more than one community and the communities may change over time. A variety of systems and methods for establishing the location of a mobile device and providing alerts to the mobile device in accordance with embodiments of the invention are described in U.S. Pat. No. 10,251,023, titled "Notification and Communication System using Geofencing to Identify Members of a Community" and issued Apr. 2, 2019, the disclosure of which is hereby incorporated by reference in its entirety.

For example, emergency alert systems in accordance with embodiments of the invention can communicate with members of a community by using geofencing to determine the location of users such that they can optionally be automatically added to a community. As such, members may be auto-subscribed into the community based on their physical locations (which may change from time to time). Members or users can also be added to the community based on their own user preferences. People can be members of more than one community and the communities can change over time. Geofencing systems can be used to determine whether a particular mobile device is physically present in a geographic region or area or range (for example, in a building or on a property) based upon the physical location of the smartphone. If the user's phone is determined to be on the property, the user's phone can be automatically added to the property community. In cases where the mobile device is determined not to be physically present on the property (e.g. not detected by proximity sensors in the location), the user can be provided with the option of voluntarily requesting to join the community. In this way, interested users (e.g.: building tenants who are away at work, or persons working at different jobsites) can be kept informed of developments and alerts with regard to a particular property community even when they are physically away from that property.

Emergency alert systems determine the "alert state" of each of the individuals' smart devices. This can be accomplished by sending a signal to the user's mobile device to determine if the "silent" or "do not disturb" setting is on. If the mobile device setting is alert-enabled (e.g. the "do not disturb" or "silent" function is not turned on), then the mobile device is ready to receive alert messages at step 210. However, in those cases where the mobile device is not alert-enabled (e.g. the "do not disturb" or "silent" function is turned on), then one of two options is possible. First, the user can be sent a message asking if the alert setting can be switched to alert-enabled. Should the user agree and grant permission, then the alert enabled setting is enabled (e.g. the "do not disturb" or "silent" function is overridden). Alternatively, the present system may instead automatically override the "do not disturb" or "silent" function, thereby enabling the mobile device to receive alerts and communications from the emergency alert system irrespective of the "do not disturb" or "silent" function. As such, an important advantage of the present system is that it can be prioritized over typical email, text, and notification traffic, even when the user's phone is set on silent, and warn building or property occupants in the event of an emergency situation such as a fire, crime, or medical emergency.

In addition to sending safety alerts, emergency alert systems can send property-specific (and/or interest group-specific) messages and non-property-specific messages (e.g. messages appealing to more than one property or interest group-specific group). The property-specific messages and the non-property-specific messages may be sent with the smartphone's "do not disturb" or "silent" function overridden and turned off. However, the more likely desired setting may be having the property-specific messages and non-property-specific messages subject to the smartphone's "do not disturb" or "silent" settings. Emergency alert systems can be configured such that only safety alert messages will override the smartphone's "do not disturb" or "silent" settings while other messages (e.g.: building advertisements/messages) will not override the smartphone's "do not disturb" or "silent" settings. The settings used can optionally be set by members of the community themselves, either by the manager or administrator of the community, or both. This is desirable such that users/community members receive safety alerts such as "fire" or "active shooter in the building" without such messages being silenced, but are able to block, silence, or turn off messages like "lunch specials in the building's cafe." In preferred aspects, such advertising may be targeted and, for example, by being tailored to businesses within a 2 to 3 block radius around building. Moreover, when the user/community member first registers with the present system, they can be asked a series of questions to better target the advertising to their desires in addition to their location.

FIG. 1 illustrates an emergency alert system 100 in accordance with an embodiment of the invention. The emergency alert system 100 includes at least one client device 110 and/or at least one emergency alert server system 120 in communication via a network 130. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Client devices 110 may provide data to and/or obtain data from the at least one emergency alert server system 120 as described herein. The client devices may determine their geographic location using a variety of location-determination techniques, including receiving positioning signals from positioning system satellites 140, cellular tower triangulation, WiFi positioning systems, geocoding systems, and the like. Emergency alert server systems 120 may store and process a variety of data as described herein. The network 130 may include a local area network (LAN), a wide area network (WAN), a wireless telecommunications network, and/or any other communication network or combination thereof.

The emergency alert system may also include a variety of virtual border transmitters 150. Virtual border transmitters may broadcast a signal that is capable of determining when an object, such as a person, mobile device, vehicle, and the like, enters or crosses a particular geographic location. The virtual border transmitter may be able to determine its own location via a variety of technologies, such as via GPS, and/or be pre-programmed to know its location. In this way, the virtual border transmitter may be used to create a virtual fence around a particular geographic area. In several embodiments, a number of virtual border transmitters are installed in a specific geographic region to create a virtual border around a particular geographic region. In many embodiments, a virtual border transmitter is installed in a vehicle (or other moving object) that may detect movement in an area surrounding the vehicle. In this way, specific geofenced areas may be created, either in fixed locations or in moving locations.

Some or all of the data described herein may be stored using any of a variety of data storage mechanisms, such as databases. These databases may include, but are not limited to relational databases, hierarchical databases, distributed databases, in-memory databases, flat file databases, XML databases, NoSQL databases, graph databases, and/or a combination thereof. The data transferred to and from various computing devices in the emergency alert system 100 may include secure and sensitive data, such as confidential documents, customer personally identifiable information, and account data. It may be desirable to protect transmissions of such data using secure network protocols and encryption and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the emergency alert system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the emergency alert system 100 in front of one or more computing devices such that any external devices may communicate directly with the specialized hardware.

Figure 2:
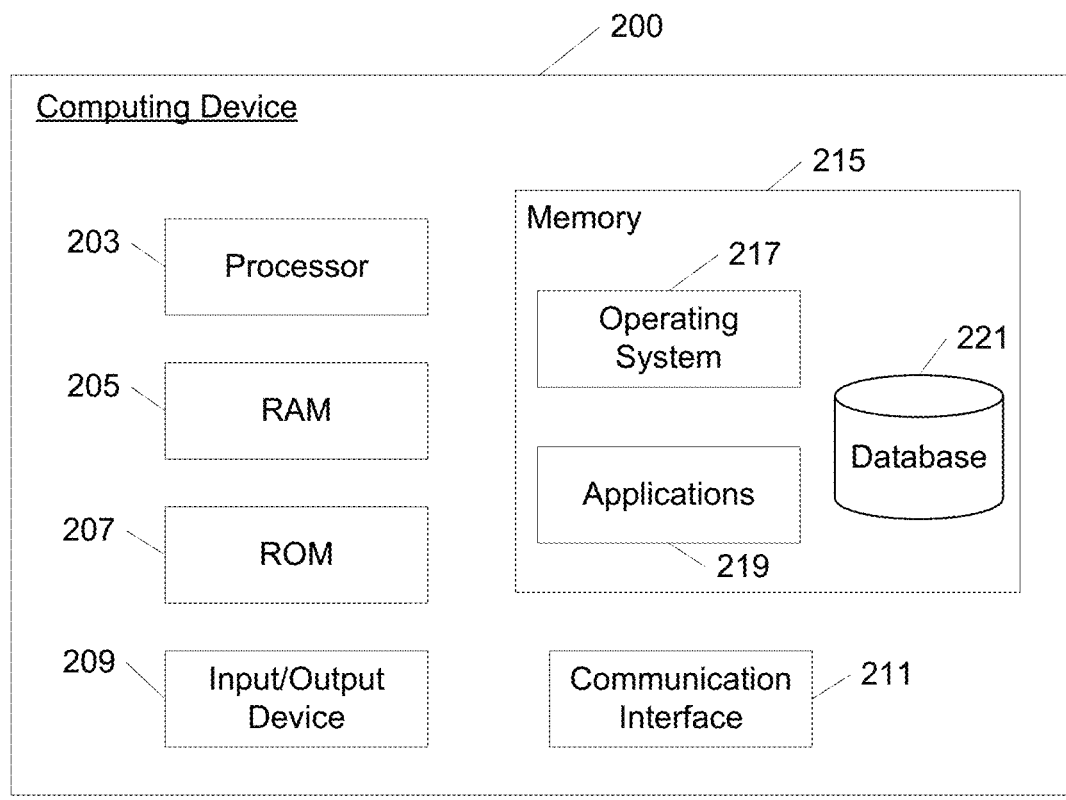
FIG. 2 illustrates an example computing device in accordance with one or more aspects described herein.

Turning now to FIG. 2, a computing device 200 in accordance with an embodiment of the invention is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Communication interface 211 may include one or more transceivers, digital signal processors, and/or additional circuitry and software for communicating via any network, wired or wireless, using any protocol as described herein. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Emergency alert system can override any alert-inhibiting state in a person's mobile device to deliver an audio or visual alert in an emergency situation. Members of a community can be determined by using geofencing to determine the location of users such that they can optionally be automatically added to a community. As such, members may be auto-subscribed into the community based on their physical locations, which may change from time to time. Members or users can also be added to the community based on their own user preferences. People can be members of more than one community and the communities can change over time.

Figure 3:
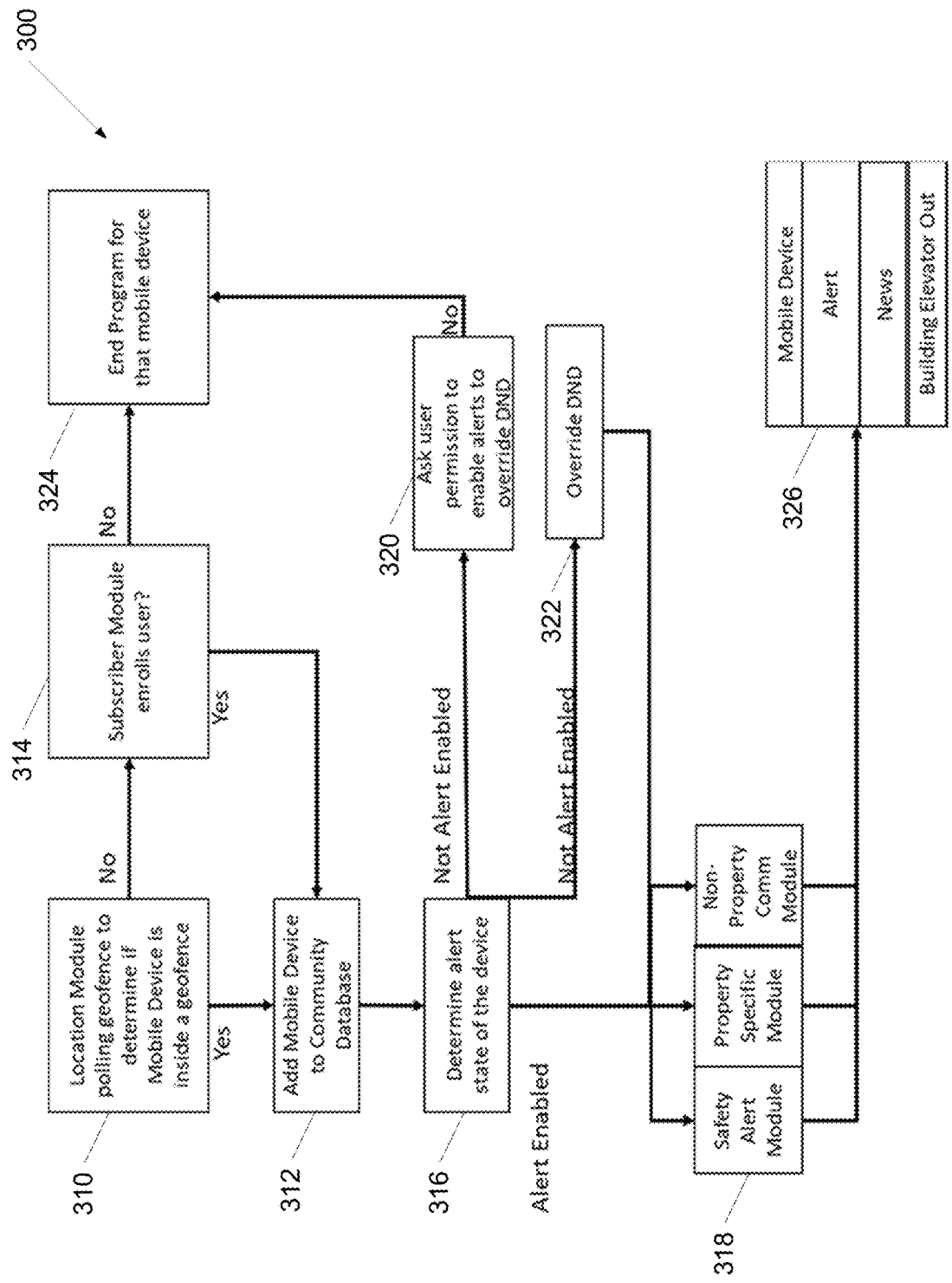
FIG. 3 illustrates a process for providing an emergency alert in accordance with one or more aspects described herein.

FIG. 3 illustrates a process for providing an emergency alerts to members of a community in accordance with one or more aspects described herein. Some or all of the steps of process 300 may be performed using any of the computing devices and/or combination thereof described herein. In a variety of embodiments, some or all of the steps described below may be combined and/or divided into sub-steps as appropriate.

At step 310, it can be determined if a mobile device is located within a particular region. For example, an emergency alert server system, using a geofencing and/or GPS systems, can determine whether a mobile device associated with a particular user is physically present in a geographic region or area or range (e.g. In a building or on a property) based upon the physical location of the mobile device. In several embodiments, the physical location of the mobile device can be determined based on a GPS location augmented using one or more beacons located in the geographic region. At step 312, if the user's mobile device is determined to be on the property, the user's mobile device can be automatically added to a community database. In several embodiments, the mobile device can be added to the community database by the emergency alert server system. At step 314, in cases where the user's mobile device is determined not to be physically present on the property (e.g. not detected by proximity sensors), the user can be provided with the option of voluntarily subscribing to join the community (e.g. enter the user's mobile device into the community database) by providing a subscription request on the mobile device. In this way, interested users (e.g. building tenants who are away at work, persons working at different job sites, and the like) can be kept informed of developments and alerts with regard to a particular property community even when they are physically away from that property. If the mobile device does not subscribe to the community, the process can end at step 324.

At step 316, the alert state of each of the subscribed user's mobile devices can be determined. This can be accomplished by sending a signal to the mobile device to determine if the mobile device's "silent" or "do not disturb" setting is on. If the mobile device setting is alert-enabled (e.g. the "do not disturb" or "silent" function is not turned on), then the mobile device is ready to receive alert messages. However, in those cases where the mobile device is not alert-enabled (e.g. the "do not disturb" or "silent" function is turned on), then one of two options is possible. First, at step 320, a message can be sent to the user asking if the alert setting can be switched to alert-enabled. Should the user agree and grant permission, then the alert enabled setting is enabled (e.g. the "do not disturb" or "silent" function is overridden). If the user does not agree to set the mobile device to an alert-enabled state, the process can end at step 324. Second, at step 322, the system may instead proceed directly to automatically override the "do not disturb" or "silent" function, thereby enabling the mobile device to receive alerts and communications from system.

At step 318, a variety of messages can be sent using the emergency alert server system. In addition to sending safety alerts through the safety alert module, the emergency alert server system also can send property-specific (or interest group-specific) messages using the property specific module and non-property-specific messages (e.g. Messages appealing to more than one property or interest group-specific group) using the non-property communication module. In a variety of embodiments, the property-specific messages sent by the property specific module and the non-property-specific messages sent by the non-property communication module may be sent with the "do not disturb" or "silent" function (e.g. an alert-inhibiting setting) of the mobile device overridden and turned off. However, the more likely desired setting may be to have the property-specific messages sent by the property specific module and non-property-specific messages sent by the non-property communication module are subject to the "do not disturb" or "silent" settings of the mobile device. In such a case, the emergency alert system can be configured such that only safety alert messages will override the "do not disturb" or "silent" settings of the mobile device, while other messages (e.g. building advertisements and/or messages) will not override the "do not disturb" or "silent" settings. The settings used can optionally be set by members of the community themselves, by the manager or administrator of the community, or both. This is desirable such that users/community members receive safety alerts such as "fire" or "active shooter in the building" without such messages being silenced, but can block, silence, or turn off messages like "lunch specials in the building's café." These various alerts can be provided via the mobile device in step 326. The alerts may be provided using any audible, visual, and/or haptic notifications indicated in the alert.

An emergency alert server system can manage the directing of alerts to different subsets of the community (and/or different communities) based upon alert criteria. The alert criteria may be stored using an alert database by a system administrator. The emergency alert server system can monitor the alert delivery and response to alerts, and/or compare those results to the alert delivery criteria in the alert database to deliver additional alerts if necessary to members of communities outside of the community from which the alert originated as defined by the rules in the alert database and/or and community database.

The emergency alert server system can obtain, depending upon the alert condition, a user response to the delivered alert. The user response can include an indication that the user viewed the alert. In many embodiments, the user having viewed the alert can be indicated by the user having interacted with their mobile device after the alert was delivered to and/or displayed by an emergency alert application executing on the mobile device, where the emergency alert application can display one or more notifications indicated in the alert by overriding any alert-inhibiting state of the mobile device as described herein. The user response can include any responses to prompts and/or questions provided in the alert, such as a request for additional information about an alert condition, the user's response to the alert condition, and the like.

FIG. 4 depicts a community database according to one or more aspects of the disclosure. The database 400 stores user data including data about the mobile device associated with the user. The stored data may include but not limited to, type of mobile device, user information, the communities, specific groups, and/or buildings the user is associated with, the current location of the mobile device, etc. Additionally, the community database can store the last know alert-receiving state of the mobile device and/or user preferences indicating how and when the user would like alerts delivered. The community database also stores any secondary devices, such as wearable devices, landlines, tablets, etc. associated with the user that can be messaged by the emergency alert server system on, as well as any secondary alert preferences the user has indicating under what circumstances they wish to receive alerts originating in other communities.

Figure 5:
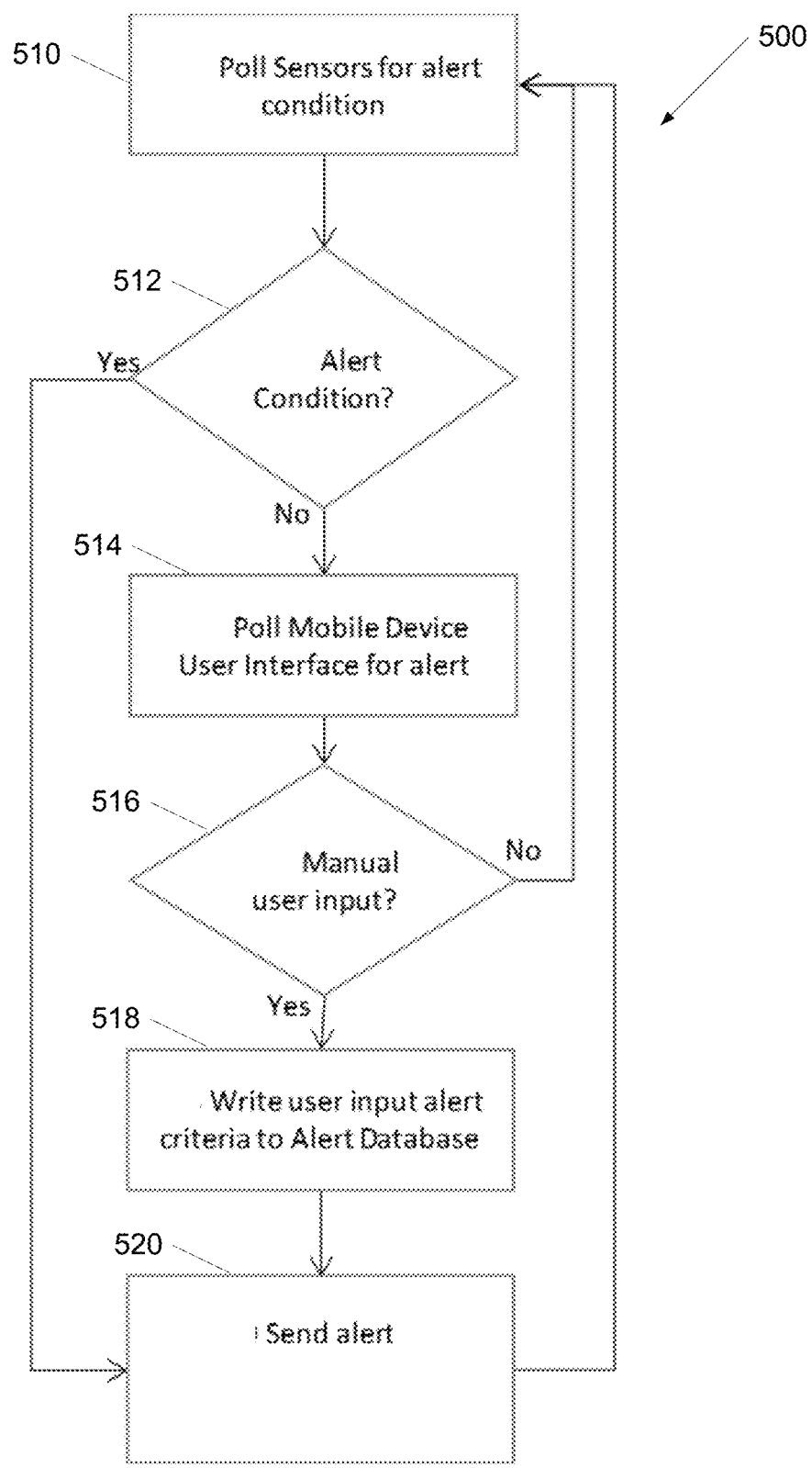
FIG. 5 depicts a flow chart for providing alerts according to one or more aspects of the disclosure.

FIG. 5 depicts a flow chart for providing alerts according to one or more aspects of the disclosure. Some or all of the steps of process 500 may be performed using any of the computing devices and/or combination thereof described herein. In a variety of embodiments, some or all of the steps described below may be combined and/or divided into sub-steps as appropriate.

At step 510, an emergency alert server system can obtain sensor data from one or more sensors. The sensors can include, but are not limited to, a variety of devices capable of detecting an alert condition such as fire alarms, smoke detectors, water sensors, occupancy sensors, equipment monitoring sensors, and the like. The sensors can be associated with a specific geographic location and/or location within a building as appropriate. At step 512, the emergency alert server system can determine if an alert condition is present based upon the sensor data. If alert conditions are present in the sensor data, the process proceeds to step 520. If the sensor data does not indicate an alert condition, the emergency alert server system can obtain and/or request a user-provided alert from a network of authorized mobile devices at step 514. The user-provided alert condition can indicate a suspicious and/or dangerous condition along with a location at which the condition was observed. At step 516, if a user-provided alert is obtained, the emergency alert server system can store the user-provided alert in an alert database at step 518. If a user-provided alert condition has not been provided at step 516, the process can return to step 510. At step 520, the emergency alert server system can transmit the alert to the appropriate mobile devices using any of a variety of communication channels as described herein.

FIG. 6 depicts an alert database according to one or more aspects of the disclosure. The database 600 contains alert information including a type of alert, groups to be alerted, and/or any other alerting criteria as appropriate. An alert can include a column indicating the content and distribution criteria for the alert. The distribution criteria can include a hierarchy of delivery rules that dictate which users in each role in a community are to be notified via their mobile devices, what level of response is required, and/or what next steps to take. For example, a school community can have an alert defined for a fire at the school. As a primary alert group, the school administrators can be notified immediately regardless of their current location until at least one responds. A secondary alert group can include first responders that have been assigned to the school. The emergency alert server system can then notify all first responders who are part of the school community who are within a threshold distance from the geographic area defining the school until at least five first responders respond. When the first responders in the school community have been notified and the number of responses received by the system is lower than the threshold, the emergency alert server system can locate additional devices assigned to users in other communities who are within the same geographic area and have signed up for fire or safety alerts. These users may belong to a tertiary (or further) alert group. The emergency alert server system can provide notifications to additional users in the tertiary group until the threshold number of responses has been received.

Figure 7:
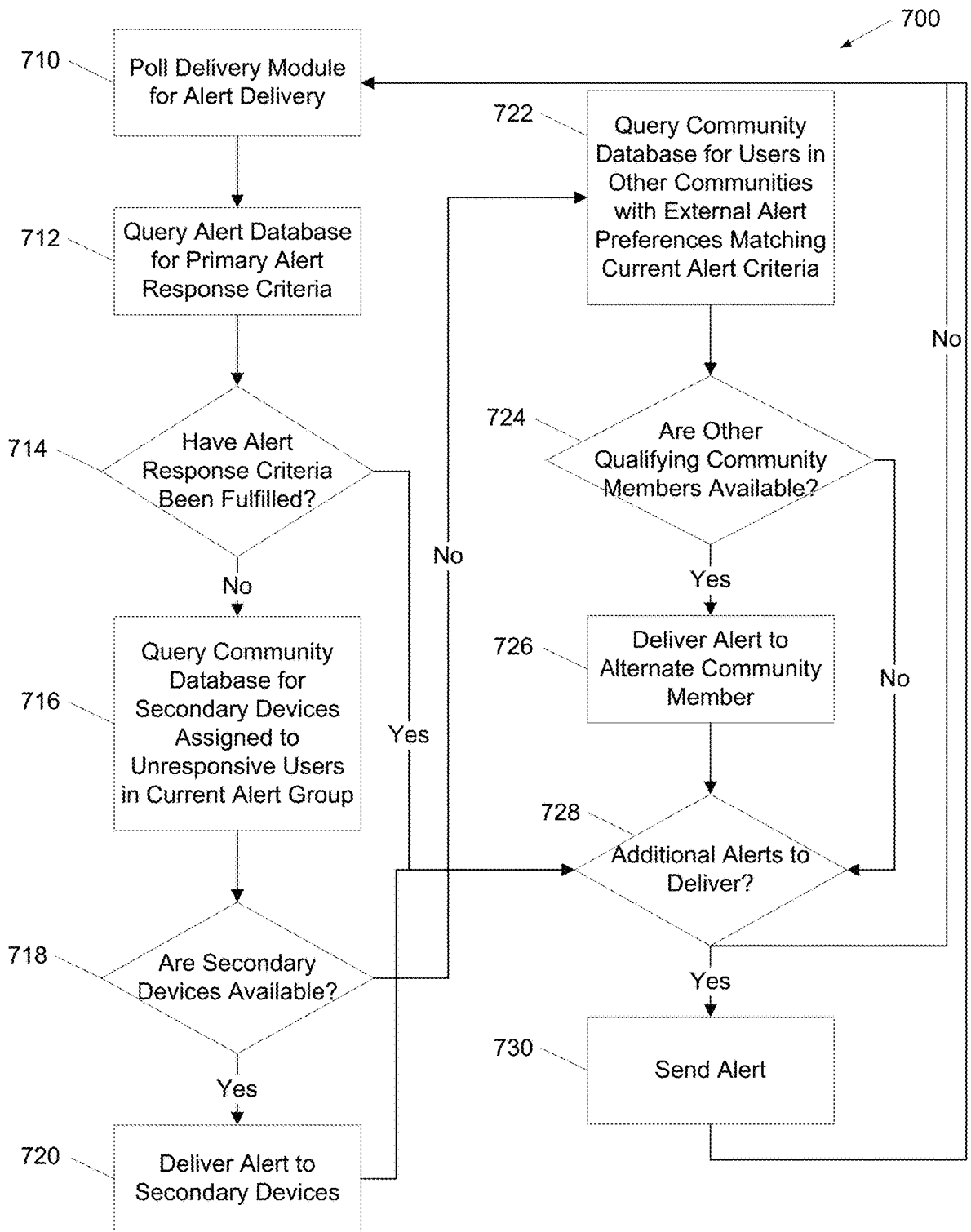
FIG. 7 depicts a flow chart for providing hierarchical alerts according to one or more aspects of the disclosure.

FIG. 7 depicts a flow chart for providing hierarchical alerts according to one or more aspects of the disclosure. Some or all of the steps of process 700 may be performed using any of the computing devices and/or combination thereof described herein. In a variety of embodiments, some or all of the steps described below may be combined and/or divided into sub-steps as appropriate.

At step 710, an emergency alert server system can obtain a request for the delivery of alerts to mobile devices in the community. The emergency alert server system can deliver the alert(s) to the appropriate users' mobile device and monitor for a response from the mobile device(s) to those messages that require a response. For example, if a fire is detected by sensors in a school, a series of alert messages can be generated and sent to the hierarchy of users in the school's community. At step 712, the emergency alert server system can query an alert database for the alert response criteria. The alert response criteria can indicate when a response is required for an alert and/or what data the response to the alert needs to include. At step 714, the emergency alert server system can determine if the alert response criteria have been fulfilled. For example, the alert response criteria can be defined as having five mobile devices in a first responder community respond to an alert. The emergency alert server system can track the responses received for an alert transmitted to the first responder community and determine if at least five of the first responders have responded. If the response criteria has been met at step 714, the process can proceed to step 728. When the response criteria has not been fulfilled at step 714, the process, can proceed to step 716.

At step 716, the emergency alert server system can query a community database for secondary devices, such as landlines, smartwatches, tablets, etc. that are associated with the users. At step 718, the emergency alert server system can determine if secondary devices are available. When a user has more than two devices, the devices associated with the user can be messaged sequentially (and/or in parallel) until a response is received or the list of secondary devices is exhausted. If a secondary device that has not already been messaged is available at step 718, the emergency alert server system can transmit the appropriate alert to the secondary device via the appropriate delivery module at step 720 and the process can proceed to step 728. If no secondary devices are available at step 718, the process can proceed to step 722.

At step 722, the emergency alert server system can query the community database for users in a secondary alert group other than the one that initiated the alert and was already included in that community's alert distribution hierarchy. The secondary alert group can have external alert preferences that match the alert delivery criteria of the current community's alert distribution hierarchy. For example, if a fire breaks out at a school and a response step in that community is to notify all the first responders in that community of the fire and ensure that at least five first responders respond to that message. If all the community's first responders have been messaged and fewer than the required five responses have been received, the emergency alert server system can transmit alerts to a secondary (tertiary, etc.) alert group including members of other communities who have selected first responder based secondary alert preferences. For example, these tertiary alert groups can include first responders from other communities or users in roles unrelated to first responders who have selected those alert preferences due to previous experience and expertise. At step 724, the emergency alert server system can determine if there are users in tertiary alert groups that meet the qualifications to be messaged. If a qualifying user that has not already been messaged is available at step 724, the emergency alert server system can transmit the appropriate alert to the user's device(s) at step 726. At step 728, the emergency alert server system can determine, based upon the alert delivery criteria in the alert database, if there are additional alerts to be delivered in response to the detected alert condition. At step 730, the emergency alert server system can send the required alerts to the appropriate devices as described herein.

An emergency alert server system can manage generating and providing alerts to different subsets of a community (and/or different communities) based upon alert criteria indicated in an alert routing database. The emergency alert server system can monitor the alert delivery and response to alerts and compare those results to alert delivery criteria in a secondary alert database in order to determine when additional alerts should be provided to qualifying mobile devices belonging to users of another community outside of the one for whom the primary alert was created and delivered. The alert database may store the alert criteria input into the system by an administrator, including the criteria for an alert condition, the subset of the community that gets the primary alert, what that alert consists of in terms of messaging, haptics, sound, and the like, what (secondary, tertiary, etc.) alert groups need to also receive alerts, and/or the criteria under which they receive alerts. The secondary alert database may store criteria for delivering alerts to various alert groups along with the content of any type of alert to be delivered to mobile devices that meet the alert criteria.

The emergency alert server system can communicate with communities of users determined to be located in a particular geographic region. The alerts provided by the emergency alert server system can override any alert-inhibiting state of a mobile device to deliver audio, visual, and/or haptic notifications in emergency situations as described herein. Emergency alert server systems can alert multiple communities based on, but not limited to, their role in the community, the alert state, and/or their geolocation. Alert states generated for one community can cause additional alerts to be generated for members of secondary communities located in such a manner that the alert conditions may affect the secondary community. For example, there may be a fire in a building and a first community (e.g. school administrators) is alerted while a second community (e.g. one or more hospitals within a threshold distance of the building) is alerted as well for the same event. If additional conditions occur, the provided alerts can be modified and/or retransmitted to the various communities. For example, a traffic jam can prevent fire trucks from reaching the building burning for 20 minutes. This second event can cause the emergency alert server system to generate updated alerts for the first and second communities that have more urgent notifications associated with them (e.g. flashing lights, a louder alarm, and/or haptic notifications instead of just an audible notification). The emergency alert server system can provide these updated alerts to the first and second communities so that the school administrators and hospitals are aware of the changed conditions so they can react accordingly.

Figure 8:
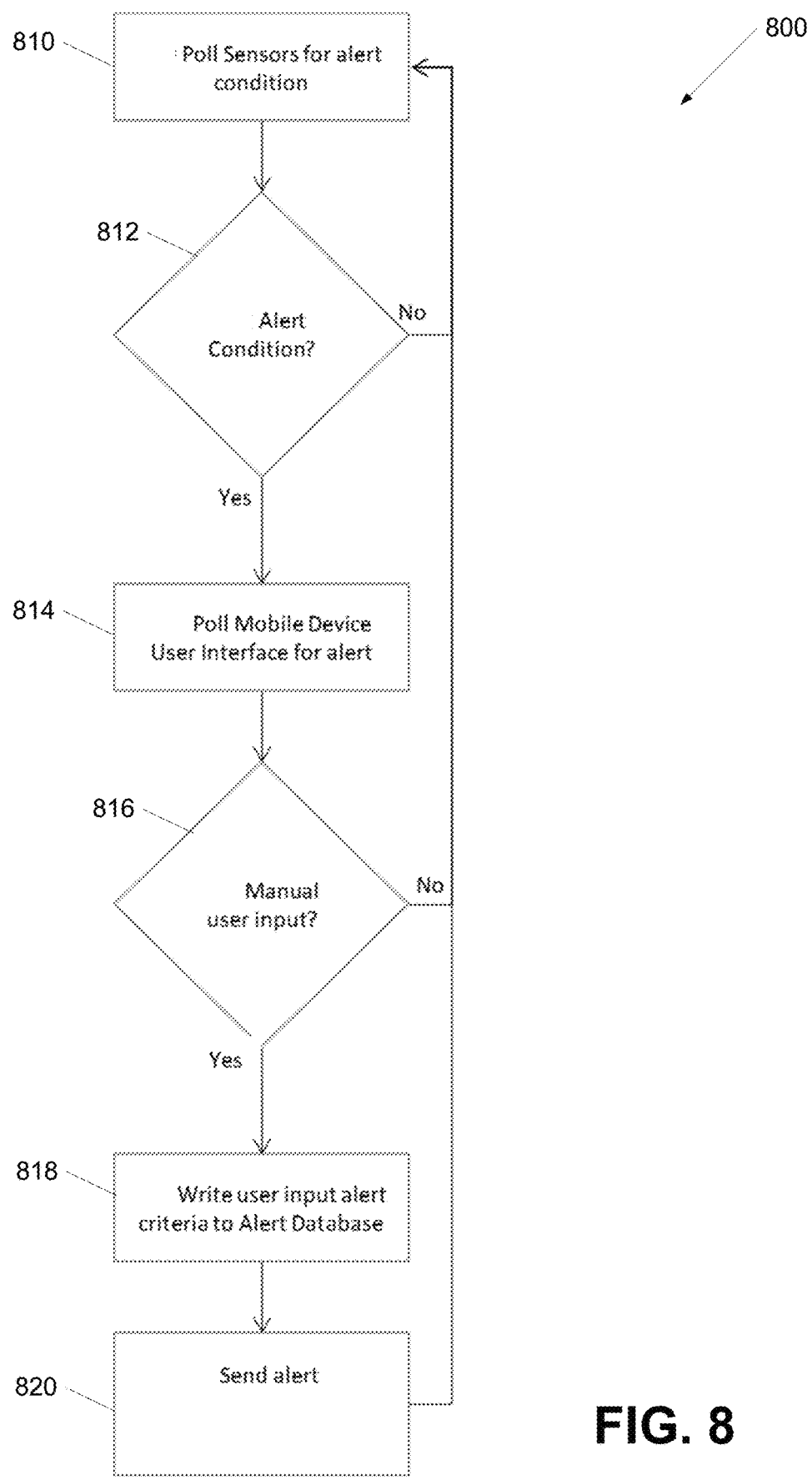
FIG. 8 depicts a flow chart for generating alerts according to one or more aspects of the disclosure.

FIG. 8 depicts a flow chart for generating alerts according to one or more aspects of the disclosure. Some or all of the steps of process 800 may be performed using any of the computing devices and/or combination thereof described herein. In a variety of embodiments, some or all of the steps described below may be combined and/or divided into sub-steps as appropriate.

At step 810, an emergency alert server system can obtain sensor data from one or more sensors. The sensors can include, but are not limited to, a variety of devices capable of detecting an alert condition such as fire alarms, smoke detectors, water sensors, occupancy sensors, equipment monitoring sensors, and the like. The sensors can be associated with a specific geographic location and/or location within a building as appropriate. At step 812, the emergency alert server system can determine if an alert condition is present based upon the sensor data. The sensor data can indicate one or more alert conditions at one or more severity levels. For example, a small amount of smoke coming from one window in the background of a photo may be indicative of a fire, but could also indicate dinner being burned on the kitchen stove. If alert conditions are present in the sensor data, the process proceeds to step 814. If the sensor data does not indicate an alert condition, the process can return to step 810.

At step 814, the emergency alert server system can obtain user-provided alert conditions from one or more mobile devices. The mobile devices can be located within a threshold distance from the location indicated in the sensor data. The user-provided alert condition can indicate a suspicious and/or dangerous condition along with a location at which the condition was observed. For example, the emergency alert server system can use a variety of image processing techniques, such as object detection and/or pattern matching, on photos uploaded to social media to identify fire or smoke in the background of an image. Additionally, the emergency alert server system can use a variety of audio processing techniques to identify features within audio data provided by a mobile device, such as detecting a gunshot captured using the microphone of a mobile device. This sensor data could come from the user's mobile devices or from infrastructure such as surveillance cameras as appropriate. The user-provided alert conditions can provide additional context to the alert conditions potentially indicated in the sensor data. For example, the user-provided alert condition can be used to determine the severity of an event so an appropriate set of alerts can be generated and transmitted to the appropriate communities and/or alert groups as described herein. At step 816, if a user-provided alert is obtained, the emergency alert server system can store the user-provided alert in an alert database at step 818. If a user-provided alert condition has not been provided at step 816, the process can return to step 810. At step 820, the emergency alert server system can transmit the alert to the appropriate mobile devices using any of a variety of communication channels as described herein.

Figure 9:
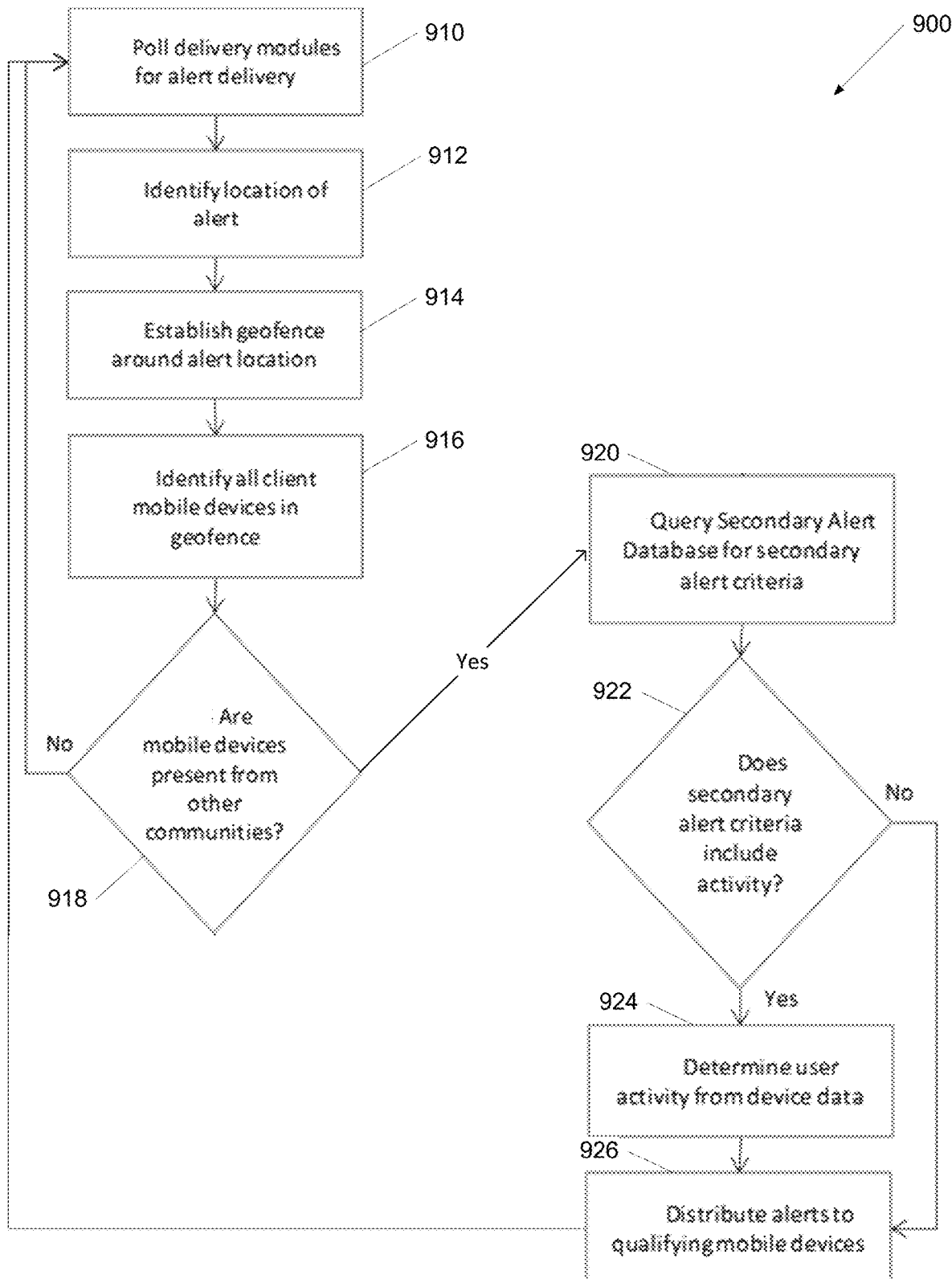
FIG. 9 depicts a flow chart for cross routing of alerts according to one or more aspects of the disclosure.

FIG. 9 depicts a flow chart for cross routing of alerts according to one or more aspects of the disclosure. Some or all of the steps of process 900 may be performed using any of the computing devices and/or combination thereof described herein. In a variety of embodiments, some or all of the steps described below may be combined and/or divided into sub-steps as appropriate.

At step 910, an emergency alert server system can monitor for the delivery of alerts to mobile devices in the community and/or responses to the delivered alerts. For example, a fire is detected by sensors in a school and that generates an alert message to a primary community (e.g. all administrators and staff) within a threshold distance of the school. At step 912, the emergency alert server system can identify the location of the alert. At step 914, the emergency alert server system can establish a geofence is established around the alert. The geofence for the alert can include a geographic area within a threshold distance of the location of the alert. The geofence can take any form, such as a circle, square, and/or any other geographic boundary as appropriate. For example, the geofence can be defined as a region the alert is located in, such as a school campus, and/or it may be based on common geographic boundaries, such as towns, neighborhoods, and the like.

At step 916, the emergency alert server system can identify one or more mobile devices located within the identified geofence that belongs to communities other than the primary community to which the alert is related. For example, a nurse at a nearby hospital might want to know of gunshots at the local school because the hospital may need emergency staff. Similarly, a person driving nearby the school may want to know of a fire in the school as the fire is likely to cause traffic congestion. At step 918, the emergency alert server system can determine if any of the mobile devices within the geofenced areas belong to communities other than the primary community to which the alert is related. If none of the mobile devices are related to the primary community, the process can return to step 910 or end. If there are mobile devices in the geofenced area that are not members of the primary community, the emergency alert server system can query a secondary alert database for secondary alert criteria at step 920. The secondary alert database can include alert conditions, severity tiers, which communities should be notified for particular alerts, which roles inside of that community should be notified, what the alert message and/or audio/visual/haptic feedback should be, and the like. At step 922, the emergency alert server system can determine if a secondary alert has an activity restriction on its delivery. For example, an out of community user who is within a few blocks of a school that has a fire may not need to be notified, but that same user who is driving would need to be notified because their route is likely to be congested by emergency vehicles. If there are activity restrictions at step 922, the process can proceed to step 924. If the alert does not have activity restrictions at step 922, the process can proceed to step 926. At step 924, the emergency alert server system can determine user activity based on data obtained from the mobile device. For example, if the mobile device is connected to a vehicle, the emergency alert server system can determine that the user is driving and the user may be interested in driving-related secondary notifications. In another example, the emergency alert server system can determine that a user is jogging near the school based on the location of the mobile device and accelerometer data captured using the mobile device indicates that the user is jogging or running. At step 926, the emergency alert server system can transmit the alerts to the identified mobile devices as described herein.

Figure 10:
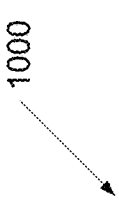
FIG. 10 depicts an alert database according to one or more aspects of the disclosure.

FIG. 10 depicts an alert database according to one or more aspects of the disclosure. The alert database 1000 contains alert information including the type of alert, groups to be alerted, and/or other alerting criteria as appropriate for a particular community. The community can be divided into alert groups and a particular user may be included in one or more of the alert groups. The alert database 1000 can include a hierarchy of delivery rules that dictate which users in each role in a community are to be notified via their mobile devices. For example, a school community can have an alert defined for a fire at the school. As a primary alert group, the school administrators can be notified immediately regardless of their current location until at least one responds. A secondary alert group can include first responders that have been assigned to the school. A secondary alert group can include teachers and staff that are located within a threshold distance of the school, while a tertiary alert group can include teachers and staff that are outside of the threshold distance of the school.

Figure 11:
FIG. 11 depicts a secondary alert database according to one or more aspects of the disclosure.

FIG. 11 depicts a secondary alert database according to one or more aspects of the disclosure. The secondary alert database 1100 contains criteria for delivering alerts to members of secondary communities other than the one from which the alert originated (e.g. a primary community), along with the content and nature of that alert. The secondary alert database 1100 contains the event type that triggered the original alert, such as a fire, smoke, or gunshot in a school, prompting alerts to the members of the school's community. Event types can be associated with a severity level, such as a tiered alert. For example, a gunshot is a severe event, but a fire may be a minor event (e.g. a burning piece of paper), a moderate event (e.g. a small pot on fire), and/or a severe event (e.g. a wing of the school is on fire). An emergency alert server system can generate alerts based on the severity of the event such that an appropriate level of notifications is provided to the proper communities based on the severity level. For example, the fire department may not need to be alerted to a burning piece of paper, but smoke coming from multiple windows indicates that the fire department should be deployed immediately. The secondary alert database can also store secondary alerts to be generated in response to a primary alert. For example, a primary alert for a fire may be an evacuation alert to all mobile devices located within the building and an alert to the fire department to report the fire. Secondary alerts for the fire can include staffing alerts to the nursing staff at the local hospital as emergency staff may be needed to respond to treat victims of the fire. The secondary alerts can be directed toward specific roles of the secondary community that should be notified, such as all users who are driving or the nursing staff at a hospital. Activity restrictions for the alert delivery, such as only delivering a traffic warning to user's who are currently driving or in a vehicle, can also be stored using the secondary activity database 1100. The secondary activity database can also store any messages and/or notifications that should be included in the alerts that are targeted towards specific communities and/or specific roles. In this way, the alerts provided to each community can provide notifications that override the alert-inhibiting state of a mobile device in accordance with the severity of the event for the particular user receiving the alert. For example, an alert for a student in a burning school can play a sound at maximum volume while vibrating the mobile device and flashing the screen and flash of the mobile device, while a simple text alert can be provided to nurses at the local hospital.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied, in whole or in part, in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method, comprising:
    obtaining an indication of an alert condition in a building;
    determining that the alert condition comprises an emergency condition in the building;
    determining a location for a first plurality of mobile devices, each mobile device in the first plurality of mobile devices being associated with a first alert group for the building;
    generating, based on the alert condition, a first alert associated with each mobile device in the first plurality of mobile devices;
    determining a second plurality of mobile devices, each mobile device in the second plurality of mobile devices being associated with a second alert group for the building;
    generating, based on the alert condition, a second alert for each mobile device in the second plurality of mobile devices;
    transmitting the generated first and second alerts to the first plurality of mobile devices and the second plurality of mobile devices;
    determining that a first mobile device in the plurality of mobile devices has not provided a response to the alert transmitted to the first mobile device;
    determining a secondary device associated with the first mobile device; and
    transmitting the alert to the secondary device.

2. The computer-implemented method of claim 1, wherein:
    the first alert comprises at least one notification selected from the group consisting of an audible notification, a visual notification, and a haptic notification;
    the second alert comprises at least one notification selected from the group consisting of an audible notification, a visual notification, and a haptic notification; and
    the first alert and the second alert comprise a different set of notifications.

3. The computer-implemented method of claim 1, wherein the first alert group is associated with a first community for the building and the second alert group is associated with a second community distinct from the building.

4. The computer-implemented method of claim 1, further comprising:
    determining that a third mobile device is located within a threshold distance the building;
    generating a third alert for the third mobile device; and
    transmitting the third alert to the third mobile device.

5. The computer-implemented method of claim 1, wherein:
    the generated alert for the first plurality of mobile devices is associated with a first tier of alert for the alert condition; and
    the generated alert for the second plurality of mobile devices is associated with a second tier of alert for the alert condition.

6. The computer-implemented method of claim 1, further comprising:
    determining the location of each mobile device in the first plurality of mobile devices;
    identifying a subset of the first plurality of mobile devices located within a threshold distance of the building; and transmitting the generated first alert to the first plurality of mobile devices comprises transmitting the generated first alert to the subset of mobile devices located within the threshold distance of the building.

7. A computing device, comprising:
a processor; and
a memory in communication with the processor and storing instructions that, when read by the processor, cause the computing device to:
obtain an indication of an alert condition in a building;
determine that the alert condition comprises an emergency condition in the building;
determine a location for a first plurality of mobile devices, each mobile device in the first plurality of mobile devices being associated with a first alert group for the building;
generate, based on the alert condition, a first alert associated with each mobile device in the first plurality of mobile devices;
determine a second plurality of mobile devices, each mobile device in the second plurality of mobile devices being associated with a second alert group for the building;
generate, based on the alert condition, a second alert for each mobile device in the second plurality of mobile devices;
transmit the generated first and second alerts to the first plurality of mobile devices and the second plurality of mobile devices;
determine that a first mobile device in the plurality of mobile devices has not provided a response to the alert transmitted to the first mobile device;
determine a secondary device associated with the first mobile device; and
transmit the alert to the secondary device.

8. The computing device of claim 7, wherein:
the first alert comprises at least one notification selected from the group consisting of an audible notification, a visual notification, and a haptic notification;
the second alert comprises at least one notification selected from the group consisting of an audible notification, a visual notification, and a haptic notification; and
the first alert and the second alert comprise a different set of notifications.

9. The computing device of claim 7, wherein the first alert group is associated with a first community for the building and the second alert group is associated with a second community distinct from the building.

10. The computing device of claim 7, wherein the instructions, when read by the processor, further cause the computing device to:
determine that a third mobile device is located within a threshold distance the building;
generate a third alert for the third mobile device; and
transmit the third alert to the third mobile device.

11. The computing device of claim 7, wherein the instructions, when read by the processor, further cause the computing device to:
determine the location of each mobile device in the first plurality of mobile devices;
identify a subset of the first plurality of mobile devices located within a threshold distance of the building; and
transmit the generated first alert to the first plurality of mobile devices comprises transmitting the generated first alert to the subset of mobile devices located within the threshold distance of the building.

12. The computing device of claim 7, wherein:
the generated alert for the first plurality of mobile devices is associated with a first tier of alert for the alert condition; and
the generated alert for the second plurality of mobile devices is associated with a second tier of alert for the alert condition.

13. A non-transitory machine-readable medium storing instructions that, when executed by one or more processors, cause the one or more processors to perform steps comprising:
obtaining an indication of an alert condition in a building;
determining that the alert condition comprises an emergency condition in the building;
determining a location for a first plurality of mobile devices, each mobile device in the first plurality of mobile devices being associated with a first alert group for the building;
generating, based on the alert condition, a first alert associated with each mobile device in the first plurality of mobile devices;
determining a second plurality of mobile devices, each mobile device in the second plurality of mobile devices being associated with a second alert group for the building;
generating, based on the alert condition, a second alert for each mobile device in the second plurality of mobile devices;
transmitting the first and second generated alerts to the first plurality of mobile devices and the second plurality of mobile devices;
determining that a first mobile device in the first plurality of mobile devices has not provided a response to the first alert transmitted to the first mobile device;
determining a secondary device associated with the first mobile device; and
transmitting the first alert to the secondary device.

14. The non-transitory machine-readable medium of claim 13, wherein:
the first alert comprises at least one notification selected from the group consisting of an audible notification, a visual notification, and a haptic notification;
the second alert comprises at least one notification selected from the group consisting of an audible notification, a visual notification, and a haptic notification; and
the first alert and the second alert comprise a different set of notifications.

15. The non-transitory machine-readable medium of claim 13, wherein the first alert group is associated with a first community for the building and the second alert group is associated with a second community distinct from the building.

16. The non-transitory machine-readable medium of claim 13, wherein the instructions, when executed by one or more processors, further cause the one or more processors to perform steps comprising:
determining that a third mobile device is located within a threshold distance the building;
generating a third alert for the third mobile device; and
transmitting the third alert to the third mobile device.

17. The non-transitory machine-readable medium of claim 13, wherein the instructions, when executed by one or more processors, further cause the one or more processors to perform steps comprising:
determining the location of each mobile device in the first plurality of mobile devices;

identifying a subset of mobile devices located within a threshold distance of the building; and transmitting the generated alert to the first plurality of mobile devices comprises transmitting the generated alert to the subset of mobile devices located within the threshold distance of the building.

18. The non-transitory machine-readable medium of claim 13, wherein:

the generated alert for the first plurality of mobile devices is associated with a first tier of alert for the alert condition; and the generated alert for the second plurality of mobile devices is associated with a second tier of alert for the alert condition.

* * * * *